United States Patent
Kapaan

[11] Patent Number: 5,106,341
[45] Date of Patent: Apr. 21, 1992

[54] COUPLING MECHANISM INCLUDING A NON-METALLIC ANNULA INTERMEDIATE ELEMENT DEFINING SPHERICAL PIVOT POCKETS

[75] Inventor: Hendrikus J. Kapaan, Nieuwegein, Netherlands

[73] Assignee: SKF Industrial Trading and Development Comp. B.V., Nieuwegein, Netherlands

[21] Appl. No.: 676,139

[22] Filed: Mar. 27, 1991

Related U.S. Application Data

[63] Continuation of Ser. No. 284,096, Dec. 14, 1988, abandoned.

[30] Foreign Application Priority Data

Dec. 15, 1987 [NL] Netherlands .................. 8703033

[51] Int. Cl.$^5$ ................................. F16D 3/42
[52] U.S. Cl. .................................... 464/125
[58] Field of Search ............... 464/106, 112, 114, 117, 464/125, 126, 134, 135, 147, 154, 129

[56] References Cited

U.S. PATENT DOCUMENTS

| | | | |
|---|---|---|---|
| 1,275,051 | 8/1918 | Larson | 464/117 |
| 1,491,565 | 4/1924 | Sundstrand | 464/125 X |
| 1,595,075 | 8/1926 | Culbertson | 464/125 X |
| 1,651,850 | 12/1927 | Swenson | 464/117 |
| 1,743,672 | 1/1930 | Hufferd | 464/125 X |
| 1,913,783 | 6/1933 | Williams | 464/125 X |
| 3,148,517 | 9/1964 | Kinser | 464/170 X |
| 3,589,142 | 6/1971 | Lecomte | 464/135 |
| 3,600,969 | 8/1971 | Pitner | 464/117 X |
| 4,121,437 | 10/1978 | Michel | 464/125 X |

Primary Examiner—Daniel P. Stodola
Assistant Examiner—Tony A. Gayoso
Attorney, Agent, or Firm—Eugene E. Renz, Jr.

[57] ABSTRACT

A coupling mechanism for coupling two elements in a manner providing for transfer of the rotation moment of one element to the other element. The mechanism comprises at least two coupling element (11, 12), each coupling element having a pair of radially outwardly directed spherical pivot portions (11', 12'). The spherical pivot portions of the coupling elements are housed in an intermediate element (8) comprising a continuous inner ring member (10) defining spherical pockets for the pivot portions and an outer ring (9) circumscribing the inner ring. The pivot portions (11', 12') are rotatable at least around their cardioids while being contained in pockets formed in the inner ring of the annular intermediate element (8), such that the one coupling element can swivel in one plane and the other coupling element can swivel in a plane perpendicular to the first relative to the intermediate element (8). At least one of the coupling elements (11, 12) is formed by an essentially solid shaft-like part at one end of which two spherical pivot portions (11', 12') have been formed and whose other end is equipped with means for attachment. The inner ring member is made of a flexible material and in one embodiment of the invention consists of a pair of continuous rings located adjacent the outer axial ends of the outer ring (9).

2 Claims, 3 Drawing Sheets

COUPLING MECHANISM INCLUDING A NON-METALLIC ANNULA INTERMEDIATE ELEMENT DEFINING SPHERICAL PIVOT POCKETS

This is a continuation of copending application Ser. No. 07/284,096 filed on Dec. 14, 1988, now abandoned.

FIELD OF THE INVENTION

The present invention relates to a coupling apparatus for coupling two generally shaft-like elements in such manner that a rotational moment can be transferred from one element to the other whereby the cardioids of these elements may form different angles with one another.

The invention has particular application in the steering column of a vehicle, including an intermediate element which is generally annular or shaped as an endless piece and which is connected to two swiveable coupling elements each of which is in turn connected, or can be connected, to a shaft-like element and each of which includes two pivot pieces constituting essentially fixed parts of the coupling element which project inside the annular intermediate element radially outward relative to the cardioid of the coupling element and which are located in each other's extension. The pivot pieces can rotate at least around their cardioids while being contained in a recess cut from the inside in the annular intermediate element, all in such manner that the one coupling element can swivel in one plane and the other coupling element can swivel in a plane perpendicular to the first relative to the intermediate element.

BACKGROUND OF THE INVENTION

A coupling of this general type is known from French Patent No. 1,538,609. In the known coupling, each of the pivot pieces is formed by a cylindrical extension contained in an equally cylindrical recess in the annular intermediate element, whereby the intermediate element is cast by means of a mold around the four cylindrical pivot pieces.

The disadvantage of the known coupling is that the smallest angle in deviation of 180° which the cardioids of the shaft-like elements interconnected through the coupling may form with each other is too limited for application of the coupling in the steering column of a vehicle. In addition, the manufacture of the coupling which involves the use of a mold is cumbersome and expensive.

Another patent of interest is the German Patent No. 917,739 which shows a coupling generally of the type under consideration. This coupling includes provisions allowing for possible changes in the length of the shaft-like elements. To this end, the pivot pieces are spherical in shape and are contained in cavities limited by a spherical plane in cylindrical sliding pieces. These sliding pieces slide back and forth inside cylindrical bores in the annular intermediate element. In addition, the pivot pieces have been formed at one end of generally rectangular arms whose other end is connected in a rotating fashion to the remaining part of the coupling element.

SUMMARY OF THE INVENTION

The object of the invention is to provide an improved coupling of the type mentioned above. This object is attained in that the annular intermediate element of the present coupling includes at least two parts located one inside the other. These parts form essentially an inner and an outer ring in which, preferably, the inner ring consists of a number of parts. In a coupling according to the invention, the smallest angle, as referred to above, may equal 80°, i.e., each shaft-like element can swivel, relative to the cardioids extending along one line of both shaft-like elements, over an angle area of 0° to 50°. An angle area of 0° to 50° is more than sufficient for application in a steering column. In addition, the coupling can be manufactured in a simple manner, by first building the annular intermediate element, followed by pressing the pivot pieces of the coupling elements into the recesses of the intermediate element. Moreover, the inner ring may be made of a nonferrous metal.

In order to obtain an outer ring with optimum torsion rigidity, the outer ring is equipped with inwardly projecting elements located between the recesses of the inner ring to absorb vibrations of the inner ring. In an advantageous embodiment, the inner ring consists of at least four axially located segments made of a relatively flexible material, each segment including a recess and contained between two of the aforementioned projecting elements of the outer ring.

Preferably, the edges of the outer ring are folded around the inner ring so that notwithstanding any wear and tear or even the complete elimination of the inner ring, the pivot pieces are formed, with an end equipped with means for attachment.

By reason of the spherical pivot pieces, the attachment of a coupling according to the invention does not affect, on account of deformation, the centering of the pivot pieces within the annular intermediate element.

The solid shaft-like part may also consist of two parts adjoining one another with their flat sides. Each part constitutes the axial half of a cylinder and is kept in contact with the other part by means of a sleeve-like element fitted around them. Also, each part forms essentially one unit with a spherical pivot piece. The sleeve-like element can also serve as a means for attachment.

At least one of the coupling elements may also consist of a solid bent part whose ends are formed by two of the aforementioned diametrically opposed spherical pivot pieces and a generally sleeve-like part welded to the bent part by one of its top faces at a place in the center between the pivot pieces and their convex sides.

BRIEF DESCRIPTION OF THE DRAWINGS

These and other objects of the present invention and the various features and details of the operation and construction thereof are hereinafter more fully set forth with reference to the accompanying drawings, where.

DESCRIPTION OF THE PREFERRED EMBODIMENTS

Figure 1:
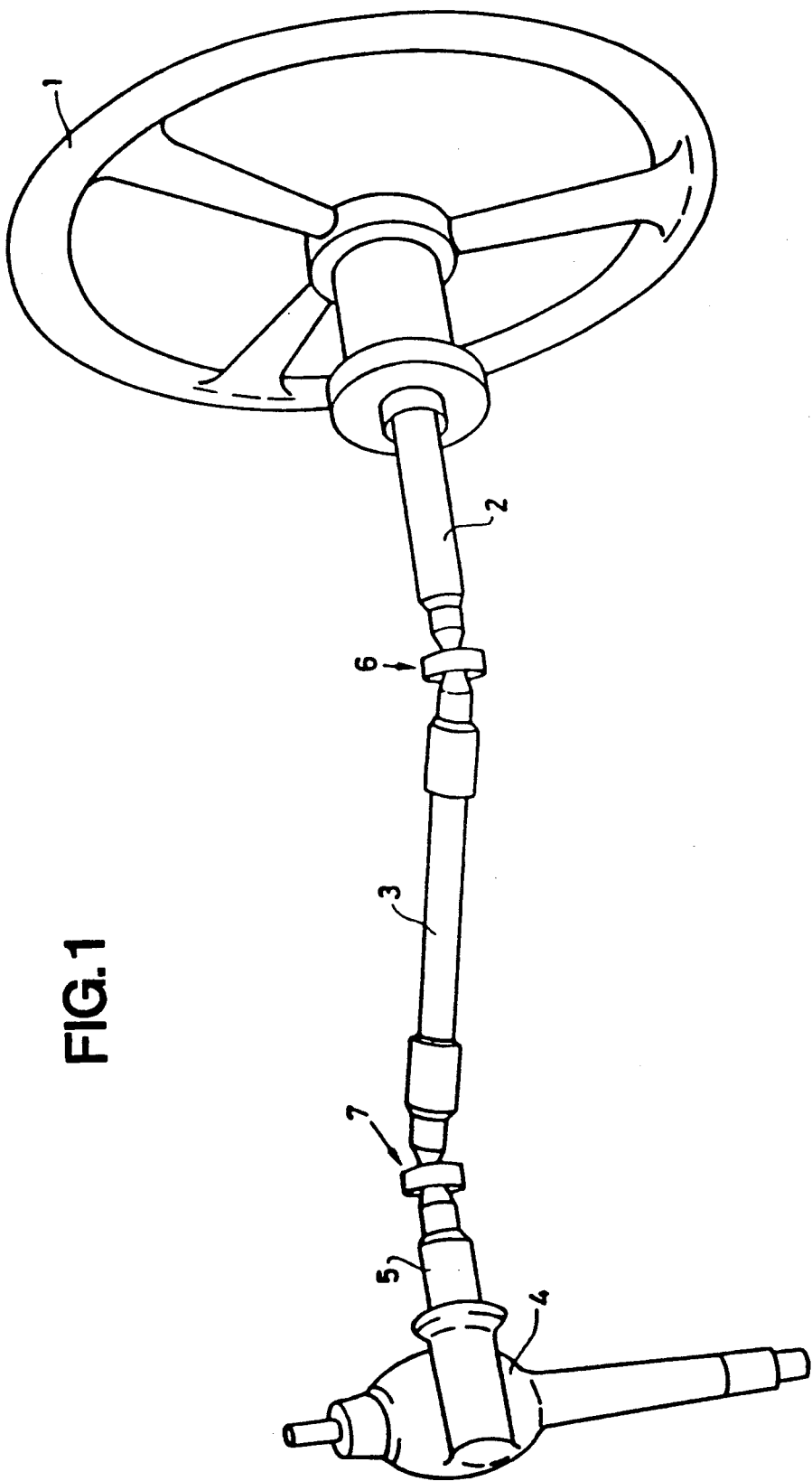
FIG. 1 is a perspective view of a steering column for a vehicle which includes two couplings according to the present invention.

As depicted in FIG. 1, the steering column includes a part 2 linked to a steering wheel 1, an intermediate shaft 3 and a shaft 5 linked to the steering box 4. By means of the the coupling 6, the part 2 is connected to the intermediate shaft 3. The intermediate shaft 3 is connected to the shaft 5 of the steering box by means of the coupling 7.

Figure 2A:
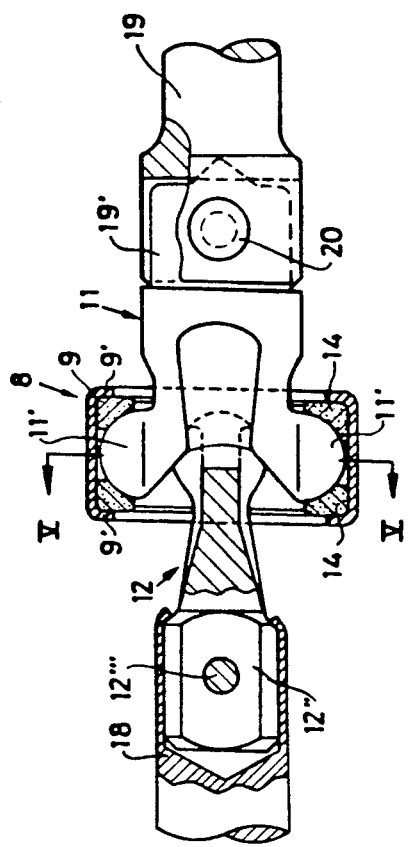
FIGS. 2a and 2b is an axial cross-sectional view of two embodiments of a coupling according to the present invention.
Figure 2B:
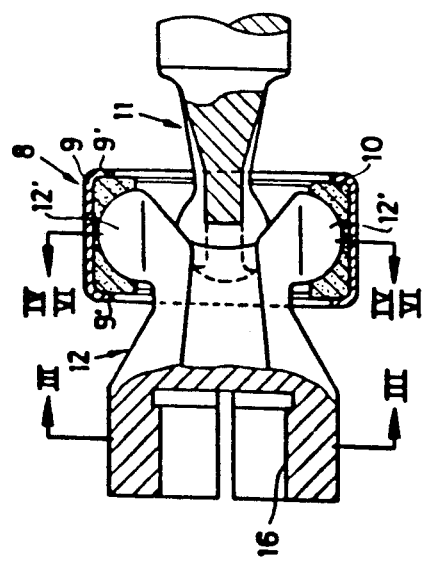
Figure 3:
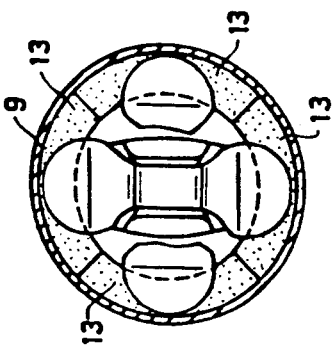
FIG. 3 is a cross-sectional view taken along line 3—3 in FIG. 2.
Figure 4:
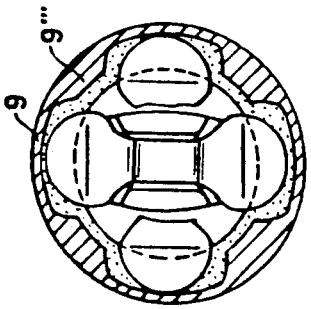
FIG. 4 is a sectional view similar to FIG. 3, but showing a modified coupling assembly.

All embodiments of the coupling according to the invention shown in FIGS. 2 through 9 include an annular intermediate element 8, an outer ring 9 and an inner ring 10. The edges 9' of the outer ring (9) are folded around the inner ring 10, and two coupling elements 11, 12 are each equipped with a pair of radially outward projecting spherical pivot pieces 11', 12'. The pivot pieces 11', 12' are contained in recesses formed within the inner ring 10 and are located at a 90° angle from one another. As illustrated in FIGS. 2 and 3, the inner ring 10 consists of two annular rings 14, each ring 14 comprising 4 axial segments 13. FIG. 4 illustrates a modified annular intermediate elements 8 comprising an outer ring 9", having a plurality of inwardly directed ribs 9''', and an inner ring 10'. The inner ring 10' consists of two annular rings 14' whose outer peripheries tightly conform to the inner profile of the outer ring 9.

Figure 5:
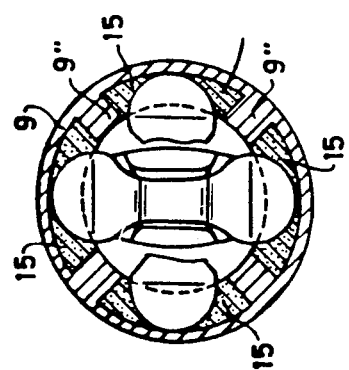
FIG. 5 is a cross-sectional view taken along line 5—5 in FIG. 2.
Figure 6:
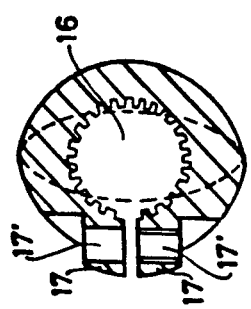
FIG. 6 is a cross-sectional view taken along line 6—6 in FIG. 2, illustrating a variation of the embodiment shown in FIG. 4.

In the embodiment illustrated in FIG. 5, the inner ring 10a is comprised of four axial segments 15, made of a relatively flexible synthetic material. The axial segments 15 are contacted on both faces by radially inward-projecting extensions 9b of the outer ring 9a. The extensions 9b are situated between the recesses of the inner ring 10a and the outer ring 9a to ensure that the coupling is more vibration-free. As shown in FIG. 2, the coupling elements 11, 12 are essentially solid shaft-like members, joined at one end by the spherical pivot pieces 11', 12'.

The left hand portion of FIG. 2 as well as FIG. 3 show a cross-sectional view of the coupling element 20 with a split bore 21 equipped with teeth on its inner surface. The coupling 20 is further supplied with flange-shaped extensions 22 having a threaded bore 23. A shaft-like element can be inserted into the bore 21 and fastened by a conventional threaded screw and nut assembly.

The coupling element 12, as depicted in FIG. 2, has two flattened side portions 12a facing one another and a cylindrical sleeve 18 closely molded about the flattened side portions 12a. The sleeve 18 and the side portions 12a can be joined to one another by means of a fastener or connector inserted through continuous opening 19.

The free end 30 of the coupling element 11, as shown in FIG. 2, is rectangular in section and contained in the fork-shaped extremity 32 of a shaft-like element 34. Through the continuous opening 36 a bolt may be inserted to which a nut must be fastened to achieve a sturdy connection between the coupling element 11 and the shaft-like element 34.

Figure 7:
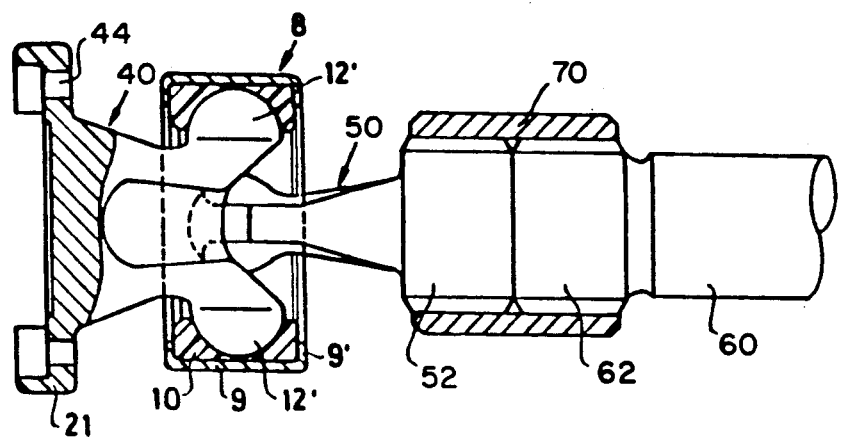
FIG. 7 is an axial cross-sectional view of another embodiment of the coupling according to the present invention.

FIG. 7 manifests another embodiment of the coupling element 40. The coupling elements 40 terminate in a flange 42 with openings 44 for attaching the coupling element 40 to an appropriately fitting element. Attachment can be accomplished through the insertion of bolts in the openings 44. The free end 52 of the coupling element 50 in FIG. 7 is a cylinder and is connected with the cylindrical end 62 of a shaft-like element 60 by means of a sleeve 70 fitted about the free end 52 and the cylindrical end 62.

Figure 8:
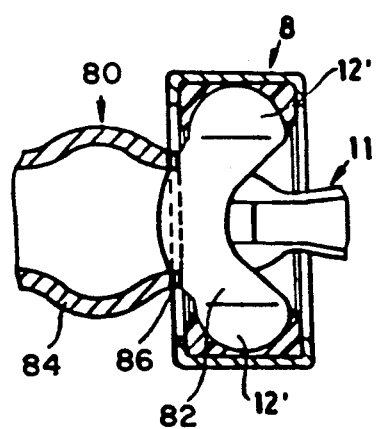
FIG. 8 is a axial cross-sectional view of still another embodiment of the present invention.

In FIG. 8 the coupling element 80 consists of a solid forged part 82 whose extremities are formed by the spherical pivot pieces 82'. The inner face of a sleeve-like part 84 is welded to the forged part 82 at 86.

Figure 9:
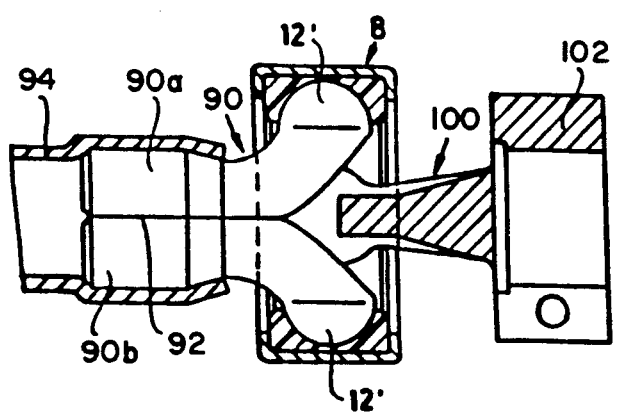
FIG. 9 illustrates yet another embodiment of the coupling according to the present invention.

Still another embodiment of the present invention is illustrated in FIG. 9. The coupling element 90 consists of two identical parts 90a and 90b which adjoin one another with their flat sides 92 and are kept in contact with one another by means of a sleeve 94 fitted about their periphery. The coupling element 100 in FIG. 9 terminates in a split ring 102 for the fastening of a shaft-like element.

I claim:

1. A coupling mechanism for coupling two elements in a manner providing for transfer of the rotation moment of one element to the other element comprising at least two coupling elements (11, 12), each coupling element having a pair of radially outwardly directed spherical pivot portions (11', 12'), the spherical pivot portions of the coupling elements housed in an intermediate element (8) comprising at least one continuous inner ring member (10) defining spherical pockets for the pivot portions and an outer ring (9) circumscribing the inner ring, said pivot portions (11', 12') being rotatable at least around their cardioids while being contained in pockets formed in the inner ring of the annular intermediate element (8), such that the one coupling element can swivel in one plane and the other coupling element can swivel in a plane perpendicular to the first relative to the intermediate elements (8), at least one of the coupling elements (11, 12) being formed by an essentially solid shaft-like part at one end of which two spherical pivot portions (11', 12') have been formed and whose other end is equipped with means for attachment, said inner ring made of a flexible material.

2. A coupling mechanism as claimed in claim 1 wherein said continuous inner ring member comprises a pair of continuous rings located adjacent the outer axial ends of said outer ring (9).

* * * * *